United States Patent
Zorn

(10) Patent No.: US 9,358,947 B1
(45) Date of Patent: Jun. 7, 2016

(54) HEAVY EQUIPMENT SEAT RESTRAINT

(71) Applicant: Billy Zorn, Pawleys Island, SC (US)

(72) Inventor: Billy Zorn, Pawleys Island, SC (US)

( * ) Notice: Subject to any disclaimer, the term of this patent is extended or adjusted under 35 U.S.C. 154(b) by 0 days.

(21) Appl. No.: 14/636,596

(22) Filed: Mar. 3, 2015

(51) Int. Cl.
*B60R 22/00* (2006.01)
*B60R 22/14* (2006.01)
*B60R 22/26* (2006.01)

(52) U.S. Cl.
CPC .............. *B60R 22/14* (2013.01); *B60R 22/26* (2013.01)

(58) Field of Classification Search
CPC .......... B60R 22/02; B60R 22/14; B60R 22/26
USPC ................................. 297/464, 484
See application file for complete search history.

(56) References Cited

U.S. PATENT DOCUMENTS

| | | | | |
|---|---|---|---|---|
| 1,300,914 A * | 4/1919 | Barnhart | ............... | B60R 22/105 297/484 |
| 1,898,090 A * | 2/1933 | Lethern | ............... | B64D 17/30 297/484 |
| 2,312,946 A * | 3/1943 | Watter | ............... | B64D 17/30 297/484 |
| 2,365,625 A * | 12/1944 | Carlisle | ............... | B60R 22/02 297/484 |
| 2,403,653 A * | 7/1946 | Geohegan | ............... | B60R 22/185 297/484 X |
| 2,606,727 A * | 8/1952 | De Haven | ............... | B64D 25/04 182/3 |
| 2,637,372 A * | 5/1953 | Angelo | ............... | A47D 1/103 297/484 X |
| 3,495,849 A * | 2/1970 | Cetrone | ............... | B60R 22/02 280/801.1 |
| 3,887,233 A * | 6/1975 | Garavaglia | ............... | B60R 22/26 297/484 X |
| 4,205,670 A * | 6/1980 | Owens | ............... | B60R 22/105 297/464 X |
| 4,391,344 A | 7/1983 | Weber | | |
| 4,480,713 A | 11/1984 | Macht | | |
| 4,488,691 A * | 12/1984 | Lorch | ............... | B64D 25/02 297/484 X |
| 4,537,446 A | 8/1985 | Roney | | |
| 4,652,053 A * | 3/1987 | Mikami | ............... | B60R 22/20 297/484 X |
| 4,819,278 A * | 4/1989 | Ramos | ............... | A47K 17/02 297/464 X |
| 4,871,044 A | 10/1989 | Strosser | | |
| 4,874,203 A * | 10/1989 | Henley | ............... | A61G 5/00 297/464 X |
| 4,923,147 A * | 5/1990 | Adams | ............... | A42B 3/0473 297/464 X |
| 4,973,083 A * | 11/1990 | Richards | ............... | B60R 22/30 297/484 X |

(Continued)

FOREIGN PATENT DOCUMENTS

EP 1295759 A3 11/2005

*Primary Examiner* — Rodney B White

(57) ABSTRACT

The heavy equipment seat restraint is a four point belt in seat restraint system for use in heavy equipment such as forklifts or bulldozers. The heavy equipment seat restraint provides a chest strap worn horizontally across the chest, a lap strap worn horizontally across the lap, and a torso strap worn diagonally across the torso. The heavy equipment seat restraint comprises chest straps, torso straps, lap straps, a chest buckle, a torso buckle, a lap buckle, a first tension adjustment device, a second tension adjustment device, a third tension adjustment device, a fourth tension adjustment device, a first anchor, a second anchor, a third anchor, and a fourth anchor.

9 Claims, 6 Drawing Sheets

(56) References Cited

U.S. PATENT DOCUMENTS

| | | | |
|---|---|---|---|
| 5,020,856 A | 6/1991 | George | |
| 5,123,673 A * | 6/1992 | Tame | B60R 22/03 297/468 X |
| 5,215,354 A * | 6/1993 | Grene | B60N 2/24 297/484 X |
| 5,628,548 A * | 5/1997 | Lacoste | B60R 22/02 297/464 |
| 5,649,744 A | 7/1997 | Apodaca | |
| 5,660,445 A * | 8/1997 | Murray | B60R 22/00 297/484 X |
| 5,806,891 A * | 9/1998 | Pokhis | B60R 22/02 280/801.1 |
| 6,056,366 A * | 5/2000 | Haynes | B60N 2/688 297/484 X |
| 6,076,894 A * | 6/2000 | Busch | B60R 22/26 297/484 X |
| 6,109,698 A * | 8/2000 | Perez | B60N 2/265 297/484 X |
| 6,305,713 B1 * | 10/2001 | Pywell | B60N 2/2222 297/484 X |
| 6,309,024 B1 * | 10/2001 | Busch | B60R 22/00 297/484 X |
| 6,364,417 B1 * | 4/2002 | Silverman | B60R 22/105 297/464 |
| 6,402,251 B1 * | 6/2002 | Stoll | B60N 2/265 297/484 X |
| 6,467,851 B1 * | 10/2002 | Mannell | A47D 13/086 297/484 X |
| 6,513,829 B1 | 2/2003 | Zumpano | |
| 6,616,242 B1 * | 9/2003 | Stoll | B60N 2/265 297/250.1 |
| 6,758,520 B2 * | 7/2004 | Pehrson | B60N 2/3013 297/216.1 |
| 6,811,186 B1 * | 11/2004 | Fraley | B60N 2/4876 280/801.2 |
| 6,817,629 B2 * | 11/2004 | Herberg | B60R 22/02 280/801.1 |
| 7,011,341 B2 * | 3/2006 | Herberg | B60R 22/02 242/378.4 |
| 7,144,085 B2 * | 12/2006 | Vits | B60N 2/265 297/483 |
| 7,201,399 B2 * | 4/2007 | Frank | B60R 22/02 280/801.1 |
| 7,625,048 B2 * | 12/2009 | Rouhana | B60R 22/02 297/484 |
| 7,922,195 B2 * | 4/2011 | Nezaki | B60R 21/18 297/484 X |
| 8,302,995 B2 * | 11/2012 | Xu | B60R 21/0136 297/484 X |
| 8,684,414 B1 * | 4/2014 | McBride | B60R 22/02 297/468 X |
| 8,783,782 B2 * | 7/2014 | Park | B60N 2/688 297/484 X |
| 8,911,013 B2 * | 12/2014 | Reinck | B60N 2/24 297/484 X |
| 8,973,945 B2 * | 3/2015 | Seidenberger | B60R 22/12 297/464 X |
| 2002/0089163 A1 * | 7/2002 | Bedewi | B60R 22/02 280/801.1 |
| 2002/0153761 A1 * | 10/2002 | Rivera | B60R 22/14 297/484 |
| 2003/0034686 A1 * | 2/2003 | Soderstrom | B60R 22/26 297/484 |
| 2003/0137180 A1 * | 7/2003 | Rouhana | B60R 22/26 297/484 |
| 2003/0173817 A1 * | 9/2003 | Vits | B60N 2/265 297/484 |
| 2004/0012242 A1 * | 1/2004 | White | B60R 22/02 297/484 |
| 2004/0036345 A1 * | 2/2004 | Herberg | B60R 22/02 297/480 |
| 2005/0073187 A1 * | 4/2005 | Frank | B60R 22/02 297/484 |
| 2007/0001495 A1 * | 1/2007 | Boyle | B60N 2/2806 297/253 |
| 2007/0246927 A1 * | 10/2007 | Okada | B60R 22/00 297/484 X |
| 2008/0197682 A1 | 8/2008 | Kim | |
| 2009/0315386 A1 * | 12/2009 | Stasiak | B60N 2/2812 297/484 |
| 2015/0069813 A1 * | 3/2015 | Furr | B60R 22/00 297/484 |

* cited by examiner

HEAVY EQUIPMENT SEAT RESTRAINT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of safety devices and seat belt restraints, more specifically, a seat restraint configured for use with heavy equipment.

SUMMARY OF INVENTION

The heavy equipment seat restraint is a four point seat restraint system for use in heavy equipment such as payloaders, forklifts, or bulldozers. The heavy equipment seat restraint provides a chest strap worn horizontally across the chest, a lap strap worn horizontally across the lap, and a torso strap worn diagonally across the torso.

These together with additional objects, features and advantages of the heavy equipment seat restraint will be readily apparent to those of ordinary skill in the art upon reading the nonetheless illustrative, embodiments when taken in conjunction with the accompanying drawings.

In this respect, before explaining the current embodiments of the heavy equipment seat restraint in detail, it is to be understood that the heavy equipment seat restraint is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heavy equipment seat restraint.

It is therefore important that the claims be regarded as including such equivalent construction insofar as they do not depart from the spirit and scope of the heavy equipment seat restraint. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description meant to be exemplary illustrations provided to enable persons skilled in the art to practice the disclosure and are not intended to limit the scope of the appended claims.

DETAILED DESCRIPTION OF THE EMBODIMENT

Figure 1:
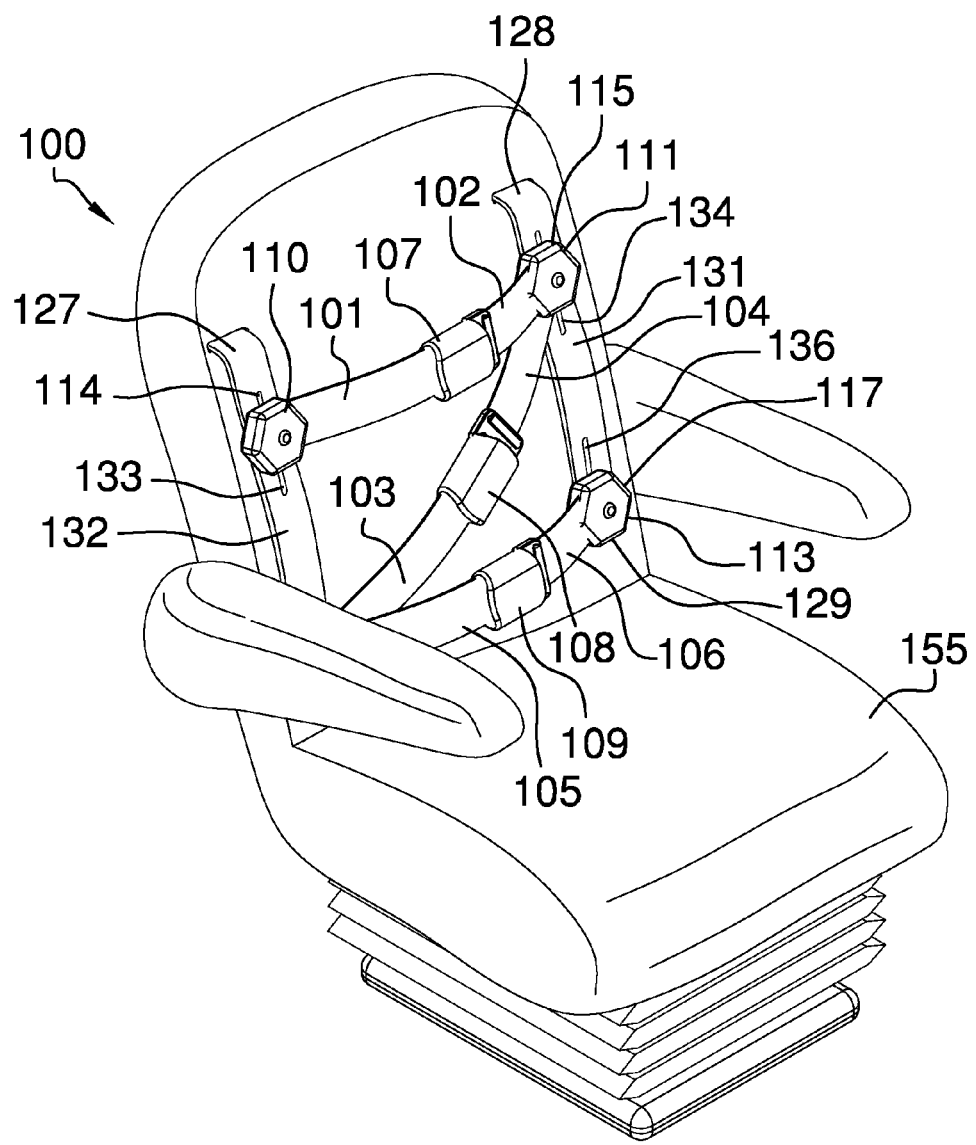
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7. The heavy equipment seat restraint 100 (hereinafter invention) comprises a first chest strap 101, a second chest strap 102, a first torso strap 103 a second torso strap 104 a first lap strap 105, a second lap strap 106, a chest buckle 107, a torso buckle 108, a lap buckle 109, a first tension adjustment device 110, a second tension adjustment device 111, a third tension adjustment device 112, a fourth tension adjustment device 113, a first anchor 114, a second anchor 115, a third anchor 116, and a fourth anchor 117.

The first chest strap 101, the second chest strap 102, the first torso strap 103 the second torso strap 104 the first lap strap 105, the second lap strap 106 are all made of 2 inch polyester webbing with a break strength between 3000 and 6000

The first chest strap 101 is further defined with a first end 141 and a second end 142. The second chest strap 102 is further defined with a third end 143 and a fourth end 144. The first torso strap 103 is further defined with a fifth end 145 and a sixth end 146. The second torso strap 104 is further defined with a seventh end 147 and an eighth end 148. The first lap strap 105 is further defined with a ninth end 149, and a tenth end 150. The second lap strap 106 is further defined with an eleventh end 151 and a twelfth end 152.

The chest buckle 107 comprises a chest latch 121 and a chest latch plate 122. The chest latch 121 is attached to the second end 142. The chest latch plate 122 is attached to the fourth end 144. The chest latch 121 is a ratchet buckle that allows the second end 142 to be pulled through the ratchet buckle to adaptively adjust the fit to the operator 153.

The torso buckle 108 comprises a torso latch 123 and a torso latch plate 124. The torso latch 123 is attached to the sixth end 146. The torso latch plate 124 is attached to the eighth end 148. The torso latch 123 is a ratchet buckle that allows the sixth end 146 to be pulled through the ratchet buckle to adaptively adjust the fit to the operator 153.

The lap buckle 109 comprises a lap latch 125, and a lap latch plate 126. The lap latch 125 is attached to the tenth end 152. The lap latch 125 is a ratchet buckle that allows the tenth end 150 to be pulled through the ratchet buckle to adaptively adjust the fit to the operator 153.

Commercially available seat restraint buckles are used. Methods to attach latches and latch plates to seat belt webbing are well known and documented in the art. The chest buckle 107, the torso buckle 108, and the lap buckle 109 are identical in construction and use.

The first anchor 114 is adaptively located near the right shoulder of the operator 153. The first anchor 114 should be attached directly to the frame of the heavy equipment 154. Alternatively, if the seat 155 frame is securely anchored to the frame of the heavy equipment 154, the first anchor 114 can be anchored to the seat 155 frame. The first anchor 114 should be anchored using anchor plates and either grade 5 or ASTM 325 hex bolts and associated hardware.

The second anchor 115 is located near the left shoulder of the operator 153. The second anchor 115 should be attached directly to the frame of the heavy equipment 154.

Alternatively, if the seat 155 frame is securely anchored to the frame of the heavy equipment 154, the second anchor 115 can be anchored to the seat 155 frame. The second anchor 115 should be anchored using anchor plates and either grade 5 or ASTM 325 hex The third anchor 116 is located near the right hip of the operator 153. The third anchor 116 should be attached directly to the frame of the heavy equipment 154. Alternatively, if the seat 155 frame is securely anchored to the frame of the heavy equipment 154, the third anchor 116 can be anchored to the seat 155 frame. The third anchor 116 should be anchored using anchor plates and either grade 5 or ASTM 325 hex bolts and associated hardware.

The fourth anchor 117 is located near the left hip of the operator 153. The fourth anchor 117 should be attached directly to the frame of the heavy equipment 154. Alternatively, if the seat 155 frame is securely anchored to the frame of the heavy equipment 154, the fourth anchor 117 can be anchored to the seat 155 frame. The fourth anchor 117 should be anchored using anchor plates and either grade 5 or ASTM 325 hex bolts and associated hardware.

Commercially available anchor plates, hex bolts and hardware are used. When locking retractors are used as tension devices, commercially available locking retractors reinforced to act as anchor points may be used.

The first tension adjustment device 110 is mounted at the first anchor 114 and is connected to the first end 141 of the first chest strap 101. The second tension adjustment device 111 is mounted at the second anchor 115 and is attached to the seventh end 147 of the second torso strap 104. The third tension adjustment device 112 is mounted at the third anchor 116 and is attached to the fifth end 145 of the first torso strap 103. The fourth tension adjustment device 113 is mounted at the fourth anchor 117 and is attached to the eleventh end 151 of the second lap strap 106. To complete the installation of the invention 100, the third end 143 of the second chest strap 102 is attached to the second anchor 115, and the ninth end 149 of the first lap strap 105 is attached to the third anchor 116

The first tension adjustment device 110, the second tension adjustment device 111, the third tension adjustment device 112, and the fourth tension adjustment device 113 are all identical in construction and use.

Figure 2:
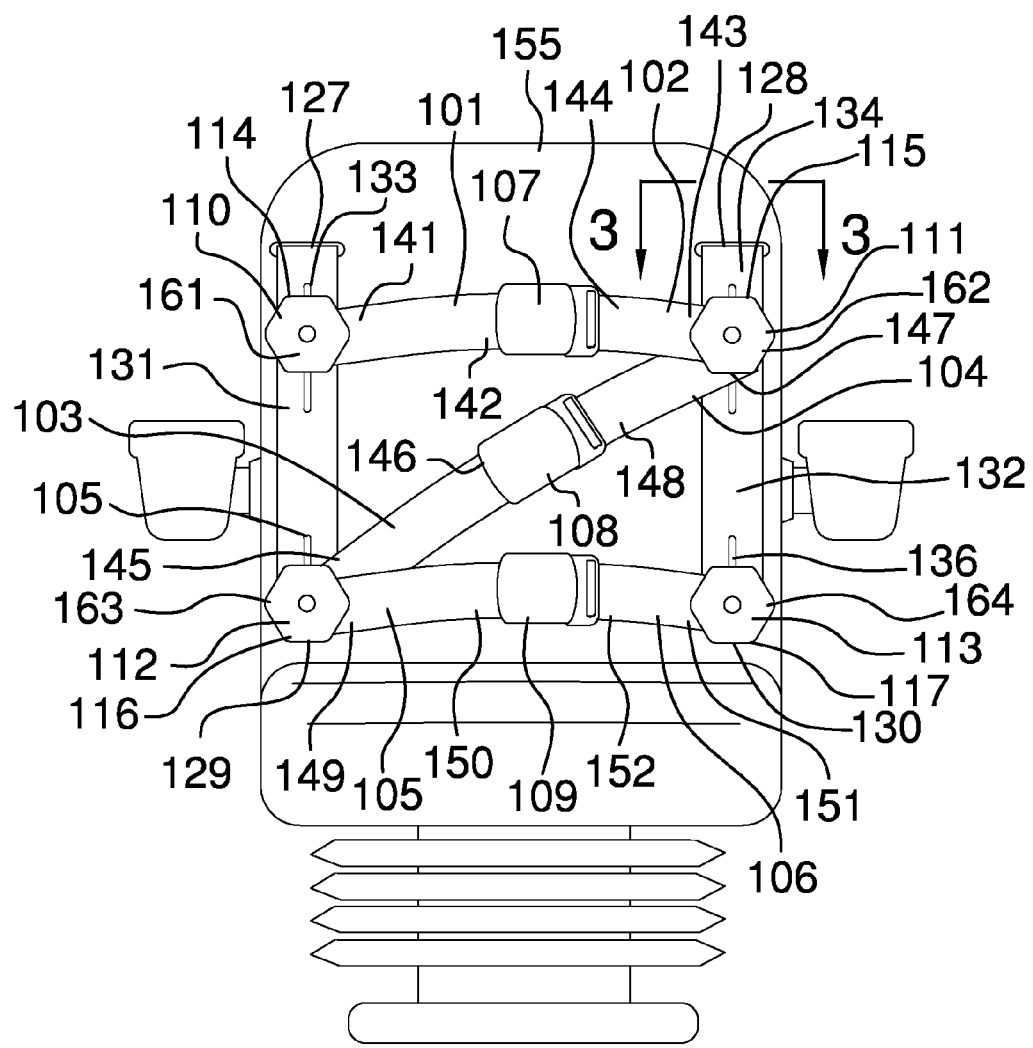
FIG. 2 is a front view of an embodiment of the disclosure.
Figure 3:
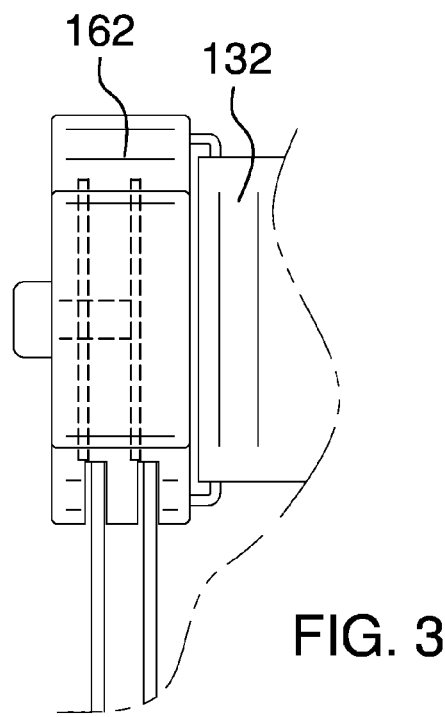
FIG. 3 is a cross-sectional view of an embodiment of the disclosure along 3-3 in FIG. 2.
Figure 4:
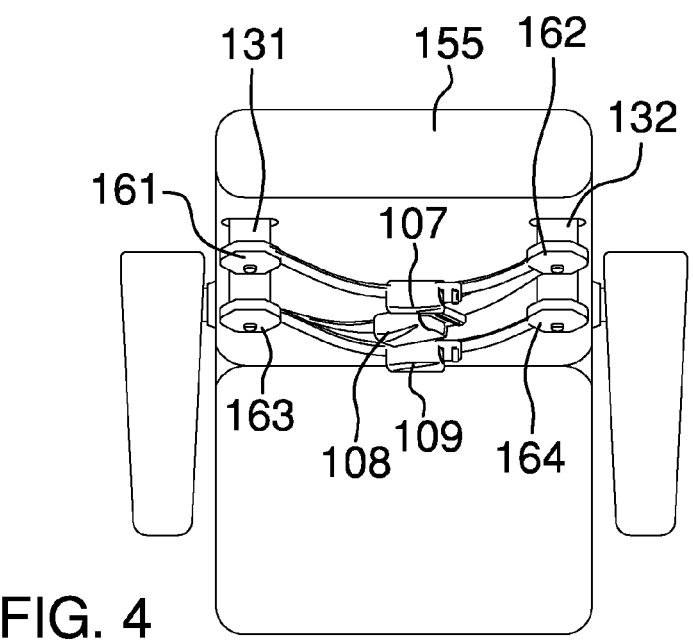
FIG. 4 is a top view of an embodiment of the disclosure.
Figure 5:
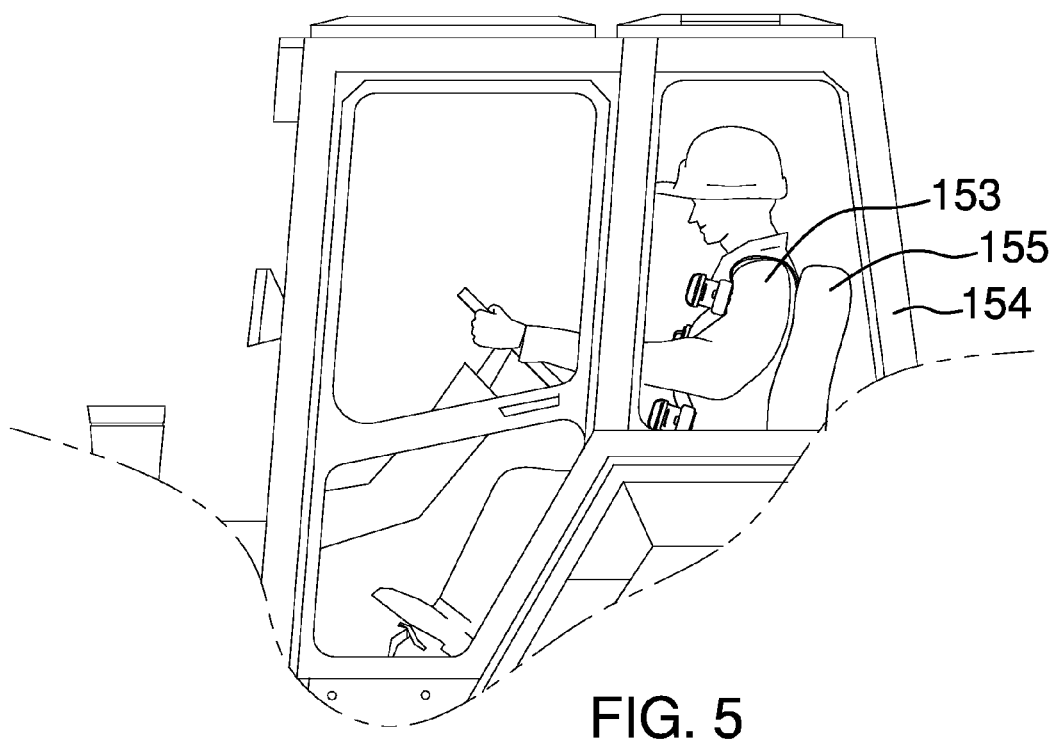
FIG. 5 is an in-use view of an embodiment of the disclosure.
Figure 6:
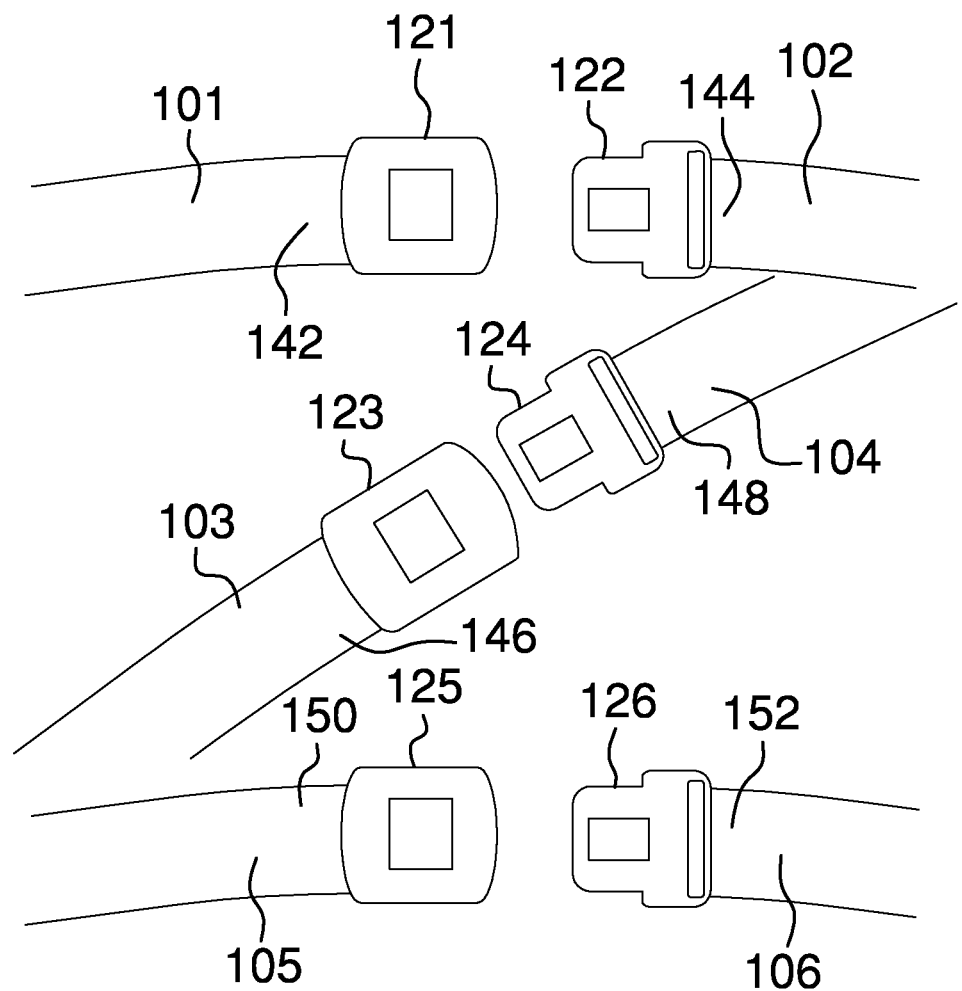
FIG. 6 is a detail view of an embodiment of the disclosure.

In the first potential embodiment of the disclosure, as shown most clearly in FIG. 2, the first tension adjustment device 110, the second tension adjustment device 111, the third tension adjustment device 112, and the fourth tension adjustment device 113 are further defined as a first metal plate 161, a second metal plate 162 a third metal plate 163 and a fourth metal plate 164 that are bolted into a first metal strip 131 and a second metal strip 132. The first metal strip 131 is further defined with a thirteenth end 127 and a fifteenth end 129. The second metal strip 132 is further defined with a fourteenth end 128 and a sixteenth end 130. The thirteenth end 127 is mounted at the first anchor point 114. The fourteenth end 128 is mounted at the second anchor point 115. The fifteenth end 129 is mounted at the third anchor point 116 and the sixteenth end 130 is mounted at the fourth anchor point 117.

A first slot 133 and third slot 135 are formed in the first metal strip 131. A second slot 135 and a fourth slot 136 are formed in the second metal strip 132. The first metal plate 161 is bolted into the first slot 133 and performs the function on the first tension adjustment device 110. The second metal plate 162 is bolted into the second slot 134 and performs the function on the second tension adjustment device 111. The third metal plate 163 is bolted into the third slot 135 and performs the function on the third tension adjustment device 112. The fourth metal plate 164 is bolted into the fourth slot 136 and performs the function on the fourth tension adjustment device 113.

In a second potential embodiment of the disclosure, the first tension adjustment device 110, the second tension adjustment device 111, the third tension adjustment device 112, and the fourth tension adjustment device 113 is provided through the use of locking retractor. Locking retractors are commercially available devices with an inertial locking mechanism that prevents the operator 153 from shifting during the locking retractors are anchored directly into the operator 153 seat 155.

Figure 7:
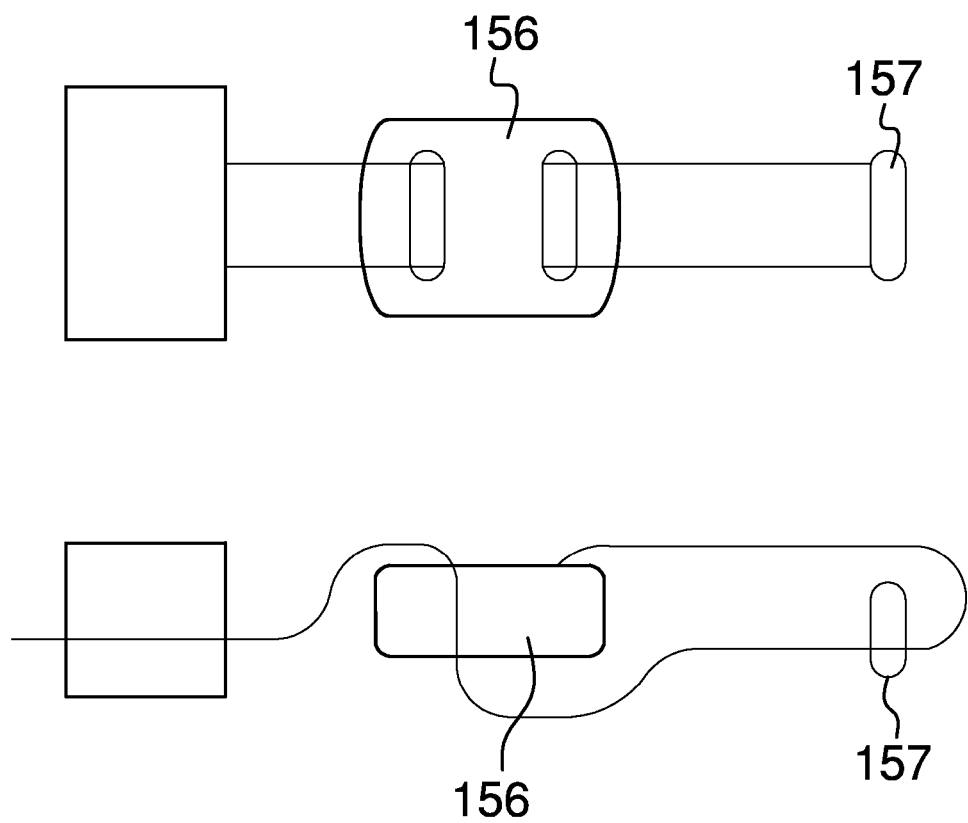
FIG. 7 is a detail view of an alternate embodiment of the disclosure.

In a third potential embodiment of the disclosure, shown most clearly in FIG. 7, a plurality of sliders 156 and a plurality of loop adjusters 157 combined with a cam buckle 158, which is also referred to as a ratchet buckle, are used to adjust and lock the webbing in place.

To use the invention 100, the operator 153 sits in the seat 155 and inserts the chest latch plate 122 into the chest latch 121, inserts the torso latch plate 125 into the torso latch 124 and the lap latch plate 125 into the lap latch 125. In the first potential embodiment, to adjust the fit of the invention the bolts holding the first metal plate 161, the second metal plate 162, the third metal plate 163 and the fourth metal plate 164 are loosened and the position within the first slot 133, second slot 134, third slot 135 and fourth slot 136, respectively, is changed.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A seat restraint system comprising:
a first chest strap, a second chest strap, a first torso strap, a second torso strap, a first lap strap, a second lap strap, a chest buckle, a torso buckle, a lap buckle, a first tension adjustment device, a second tension adjustment device, a third tension adjustment device, a fourth tension adjustment device, a first anchor, a second anchor, a third anchor, and a fourth anchor;

wherein the seat restraint system is adapted for use with heavy equipment;

wherein the seat restraint system is adapted for use in restraining an operator using the heavy equipment;

wherein the first chest strap and the second chest strap are adaptively worn horizontally across the chest of the operator;

wherein the first torso strap and the second torso strap are adaptively worn diagonally across the torso of the operator;

wherein the first lap strap and the second lap strap are adaptively worn horizontally across the lap of the operator;

wherein the chest buckle comprises a chest latch and a chest latch plate;

wherein the torso buckle comprises a torso latch and a torso latch plate;

wherein the lap buckle comprises a lap latch and a lap latch plate;

wherein the first chest strap is further defined with a first end and a second end;

wherein the second chest strap is further defined with a third end and a fourth end;

wherein the first torso strap is further defined with a fifth end and a sixth end;

wherein the second torso strap is further defined with a seventh end and an eighth end;

wherein the first lap strap is further defined with a ninth end and a tenth end;

wherein the second lap strap is further defined with an eleventh end and a twelfth end;

wherein the chest latch is attached to the second end;

wherein the chest latch plate is attached to the fourth end;

wherein the torso latch is attached to the sixth end;

wherein the torso latch plate is attached to the eighth end;

wherein the lap latch is attached to the tenth end;

wherein the lap latch plate is attached to the twelfth end;

wherein the first anchor is adaptively located at a right shoulder of the operator;

wherein the second anchor is adaptively located at a left shoulder of the operator;

wherein the third anchor is adaptively located at a right hip of the operator;

wherein the fourth anchor is adaptively located at a left hip of the operator;

wherein the first tension adjustment device is mounted at the first anchor;

wherein the second tension adjustment device is mounted at the second anchor;

wherein the third tension adjustment device is mounted at the third anchor;

wherein the fourth tension adjustment device is mounted at the fourth anchor;

wherein the first tension adjustment device is attached to the first end of the first chest strap;

wherein the second tension adjustment device is attached to the seventh end of the second torso strap;

wherein the third tension adjustment device is attached to the fifth end of the first torso strap;

wherein the fourth tension adjustment device is attached to the eleventh end of the second lap strap;

wherein the third end of the second chest strap is attached to the second anchor;

the ninth end of the first lap strap is attached to the third anchor.

2. The seat restraint system according to claim 1 wherein the first chest strap, the second chest strap, the first torso strap, the second torso strap, the first lap strap, and the second lap strap are all made of webbing.

3. The seat restraint system according to claim 2 wherein the webbing is made from polyester;
wherein the webbing has a break strength that is between 3000 and 6000 pounds; wherein the webbing is between 1.75 and 2.25 inches in width.

4. The seat restraint system according to claim 3
wherein the lap latch is a ratchet buckle that allows the tenth end to be pulled through the ratchet buckle;
wherein the torso latch is a ratchet buckle that allows the sixth end to be pulled through the ratchet buckle;
wherein the chest latch is a ratchet buckle that allows the second end to be pulled through the ratchet buckle.

5. The seat restraint system according to claim 4 wherein the first tension adjustment device, the second tension adjustment device, the third tension adjustment device, and the fourth tension adjustment device are identical.

6. The seat restraint system according to claim 5
wherein the seat restraint system further comprises a first metal strip;
wherein the seat restraint system further comprises a second metal strip;
wherein the first metal strip is further defined with a thirteenth end and a fifteenth end;
wherein the second metal strip is further defined with a fourteenth end and a sixteenth end;
wherein the thirteenth end is mounted at ire a first anchor point;
wherein the fourteenth end is mounted at a second anchor;
wherein the fifteenth end is mounted at a third anchor;
wherein the sixteenth end is mounted at a fourth anchor;
wherein a first slot and third slot are formed in the first metal strip;
wherein a second slot and a fourth slot are formed in the second metal strip.

7. The seat restraint system according to claim 6
wherein the first tension adjustment device further comprises a first metal plate;
wherein the second tension adjustment device further comprises a second metal plate;
wherein the third tension adjustment device further comprises a third metal plate;
wherein the fourth tension adjustment device comprises a fourth metal plate;
wherein the first metal plate is bolted into the first slot;
wherein the second metal plate is bolted into the second slot;
wherein the third metal plate is bolted into the third slot;
wherein the fourth metal plate is bolted into the fourth slot.

8. The seat restraint system according to claim 5 wherein the first tension adjustment device is a first locking retractor, the second tension adjustment device is a second locking retractor, the third tension adjustment device is a third locking retractor, and the fourth tension adjustment device is a fourth locking retractor.

9. The seat restraint system according to claim 5 wherein first tension adjustment device comprises a slider, a loop adjuster, and a cam buckle, the second tension adjustment device comprises a slider, a loop adjuster, and a cam buckle, the third tension adjustment device comprises a slider, a loop adjuster, and a cam buckle, and the fourth tension adjustment device comprises a slider, a loop adjuster, and a cam buckle.

\* \* \* \* \*